(12) United States Patent
Long

(10) Patent No.: US 12,357,135 B2
(45) Date of Patent: Jul. 15, 2025

(54) DUAL FUNCTION ICE SCRAPER AND VEHICLE WINDOW RELEASING DEVICE

(71) Applicant: Michael Allan Long, Erskine (CA)

(72) Inventor: Michael Allan Long, Erskine (CA)

(73) Assignee: Michael Allan Long, Erskine, CA (US)

( * ) Notice: Subject to any disclaimer, the term of this patent is extended or adjusted under 35 U.S.C. 154(b) by 259 days.

(21) Appl. No.: 17/235,208

(22) Filed: Apr. 20, 2021

(65) Prior Publication Data

US 2022/0330766 A1     Oct. 20, 2022

(51) Int. Cl.
    *A47L 1/16*   (2006.01)
    *A47L 1/06*   (2006.01)
    *B60S 3/04*   (2006.01)

(52) U.S. Cl.
    CPC ................... *A47L 1/16* (2013.01); *A47L 1/06* (2013.01); *B60S 3/045* (2013.01)

(58) Field of Classification Search
    CPC ............... A47L 1/16; A47L 1/06; B60S 3/045
    USPC ...................................................... 15/236.01
    See application file for complete search history.

(56) References Cited

U.S. PATENT DOCUMENTS

| | | | |
|---|---|---|---|
| 3,017,649 A * | 1/1962 | Racicot | A47L 1/06 D4/118 |
| D307,206 S * | 4/1990 | Boyd | D32/46 |
| 6,018,836 A | 2/2000 | Williams | |
| 6,994,322 B1 | 2/2006 | Wittman | |
| 7,103,936 B1 * | 9/2006 | Brandon | B27G 17/04 D4/118 |
| 7,913,349 B2 | 3/2011 | Byrnes | |
| 8,151,470 B2 | 4/2012 | Hallman | |
| 8,312,589 B1 * | 11/2012 | Thomas | A47L 1/16 15/236.08 |
| 8,713,745 B2 | 5/2014 | Szablewski | |
| D760,460 S | 6/2016 | Kunnas et al. | |
| 2008/0030035 A1 | 2/2008 | Wang | |
| 2013/0097793 A1 * | 4/2013 | Henningsen | A46B 15/0081 15/144.4 |
| 2018/0304866 A1 | 10/2018 | Verbakel | |
| 2019/0283086 A1 * | 9/2019 | Schindler | B08B 1/16 |

FOREIGN PATENT DOCUMENTS

CN           206615199 U         11/2017

* cited by examiner

*Primary Examiner* — Katina N. Henson
(74) *Attorney, Agent, or Firm* — Argus Intellectual Enterprise, LLC; Jordan Sworen; Daniel Enea

(57) ABSTRACT

The currently described embodiments of the invention relate to an ice and snow scraper device that is designed to have dual functionality. One of the scraper blades is sized, shaped and dimensioned to scrape ice and snow from a vehicle windscreen of from vehicle windows. The other end is sized, shaped and dimensioned to fit between the glass of vehicle windows and the weather stripping so as to be able to free up frozen vehicle windows.

10 Claims, 5 Drawing Sheets

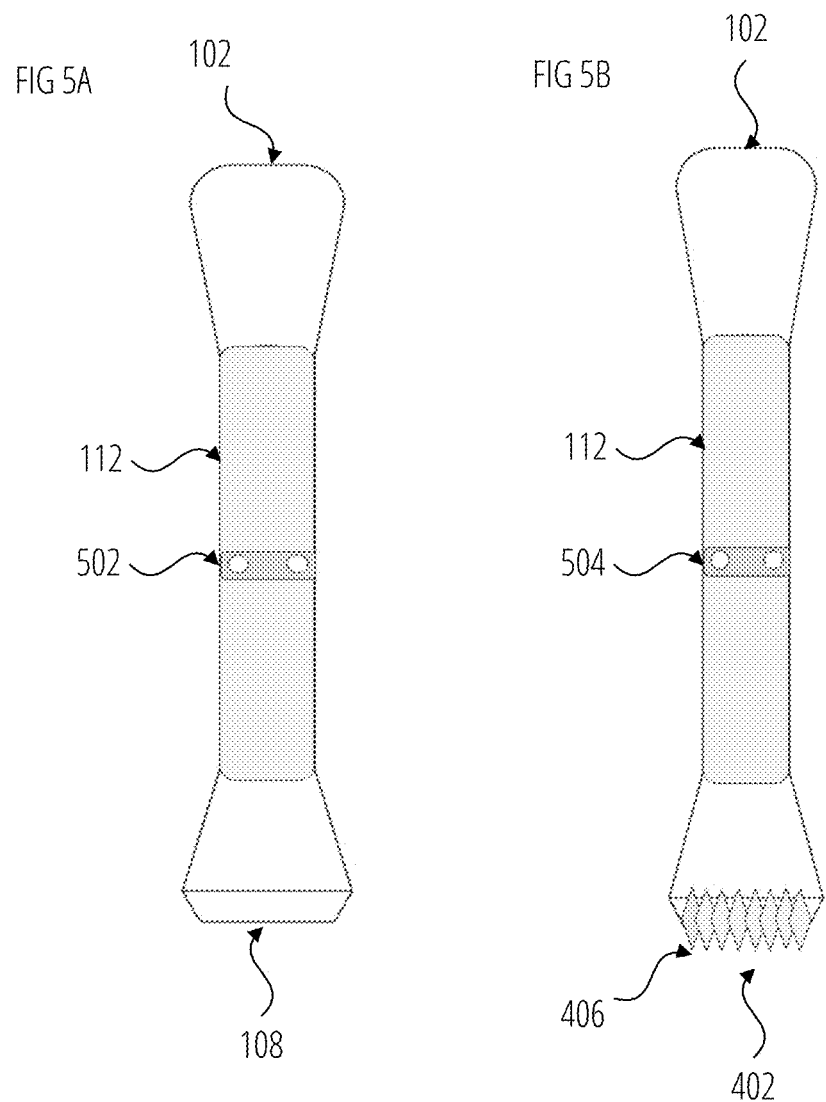

DUAL FUNCTION ICE SCRAPER AND VEHICLE WINDOW RELEASING DEVICE

FIELD OF THE INVENTION

The present invention relates generally to the field of ice and snow scrapers, specifically to ice and snow scrapers having dual functionality, more specifically to a dual function ice and snow scraper having the ability to sever an ice seal between a vehicle window and the surrounding window seal.

BACKGROUND

U.S. Pat. No. 8,151,470 (Hallman) discloses an apparatus and method for alleviating ice freeze-up of vehicle windows. The apparatus comprises a handle and a blade extending from the handle. The blade has a bend and a distal end which is curved outwardly in the plane of the blade. The length of the blade segment between the bend and its distal end is selected to be slightly longer than the distance between the upper and lower seals whereby this blade segment may be inserted between the window outside surface and the upper and lower seals and then slid along the window to sever any ice seal existing between the outside window surface and the upper and lower seals to free up the frozen vehicle window for normal operation. This apparatus has the blade projecting at an angle from the handle which makes the apparatus less compact for storage. Moreover, the apparatus and method relate to a single function of freeing vehicle windows from the surrounding seals.

CN Pat. No. 206615199 (Hongzheng) discloses an automotive glass scraper plate. The scraper has small and large triangular scraper plates located at either end of the device. It appears that the small triangular blade can clear the rearview mirror, and the large glass scraper plate clears accumulated ice and snow can from automotive glass. The structure and function of the device is dual purpose, but neither of the functions is to free windows from the surrounding seals from ice build-up.

U.S. Pat. No. 8,713,745 (Sablewski) discloses a thick and thin ice scraper. The ice scraper is adapted to remove materials such as ice, frost, and/or snow from automobile window glass surfaces or other window glass surfaces that has a longitudinally extending handle composing of two separate ice scraping devices. The flat scraping device which is similar to most traditional ice scrapers is designed to remove thick ice and snow by applying force from the handle in a general parallel direction to the length of the handle against the surface to be scraped. The opposite or opposing side of the intermediate portion of the ice scraper body contains a double beveled edged circular shaped ice scraper designed to remove frost/thin ice using a clockwise or counter clockwise motion, utilizing the handhold or flat scraping surface or both as a handle. Again, the structure and function of the device is dual purpose, but neither of the functions is to free windows and surrounding seals from ice build-up.

U.S. Pat. Appl. No. 2019/0283086 (Schindler) discloses a double-sided convex mirror cleaning tool. The double-sided convex mirror cleaning tool comprises a fixed, concave cleaning blade and a handle. Such a device contemplates the use of resilient and flexible materials for the cleaning blade suitable for use in cleaning windows, and resilient and solid materials suitable for structural rigidity in the device main body. The cleaning blade is a concave blade meant to contour most effectively with convex mirrors commonly found on tractor-trailer combinations. The device may further comprise a second, straight cleaning blade for use in the cleaning of planar mirrors. This tool has the blade or blades projecting at an angle from the handle which makes the apparatus less compact for storage. The structure and function of the tool is dual purpose, but neither of the functions is to free windows and surrounding seals from ice build-up.

U.S. Pat. No. 6,018,836 (Williams) discloses a scraper tool. The tool is of a one-piece construction which is conformable for use in scraping various surfaces. The tool is made up of a generally arched body portion having an intermediate handle section to be gripped by the user and scraper blades at opposite ends of the body portion. The scraper blades are provided with edges extending in opposite directions transversely across the width dimension at each end so that the application of force in either lengthwise direction to the body portion will cause one of the blades to scrape the materials away from the surface. The shape of the tool is bulky and somewhat difficult to store, and the curved structure of the scraper blades prevent them from extending into the space between vehicle windows and the surrounding seals.

U.S. Design 760,460 (Kunnas) illustrates a snow brush and ice scraper. The ornamental design features an angled scraper head at one end and a snow brush along opposing second ice scraper at the other end. The structure and function of this device does not relate to removing ice build-up from vehicle windows and the surrounding seals.

U.S. Pat. No. 7,913,349 (Byrnes) discloses a two-blade scraping device. The hand-held scraper device containing a stowable multi blade pivoting head. The pivoting head is comprised of at least two scraping elements which remain at a fixed angle relative to each other while still allowing a pivoting action of the head assembly independently from the handle. The angle of the scraping elements relative to each other is set such that as the two scraping elements are jointly presented against the work surface, they will be maintained at an angular attitude conducive to a scraping action in both a push and pull direction. The pivoting head can be collapsed for more efficient stowage or as an alternate configuration for specific scraping applications. This device is easily stowable, but does not a structure suitable for removing ice build-up from vehicle windows and the surrounding seals.

U.S. Pat. No. 6,994,322 (Wittman) discloses a frozen vehicle door puller. The device is intended to be used with vehicles that sit for a long enough period of time in cold weather that their doors freeze shut. The device comprises a hook attached to a keychain, the hook is positioned around the edge of a vehicle door. The hook is then used to open the door by levering against the adjacent door jamb. The hook on this device would therefore not be suitable to free vehicle windows from the surrounding seals because the levering force may crack the window.

U.S. Pat. Appl. 2008/0030035 (Wang) discloses a removing tool removing a protection strip of car. A tool for removing a protection strip of car comprises mainly a handle, a stem part and a shovel blade. When the tool is used for removing a protection strip of a car, the edge part of a plate of the L-shaped angle is set in contact with the protection strip, and is pushed with a pressure; in that case, the adhesive under the protection strip can be cut and removed easily and quickly; simultaneously, the space between the S-shaped plate and the plate part can be used for providing a guide function to the cut pressure. The tool is compact, but impractical for removal of snow and ice from windscreens and door windows.

U.S. Pat. Appl. 2018/0304866 (Verbakel) discloses a hand-held car window cleaning tool. The tool comprises a frame part and a handle attached to said frame part. The frame part is provided with at least one of: a scraper blade for removing frost, ice or snow; a squeegee blade for removing liquid, dirt or snow; and a sponge. The hand-held cleaning tool is arranged such that the position of the frame part is adjustable with respect to the handle. The tool is dual function but structure and function of the frost, ice and snow removal scraper blade does not find utility in freeing vehicle windows from the surrounding seals.

All documents cited herein are incorporated by reference.

None of the above cited documents, alone or in combination satisfy the need for a dual function snow and ice scraper that addresses the above-mentioned deficiencies.

BRIEF SUMMARY

It is an object of the invention to provide a dual function ice scraper and vehicle window releasing device.

In accordance with an aspect of the invention there is provided a dual function ice scraper and vehicle window releasing device, said device comprising: a window seal releasing end, said releasing end comprising a blade section and a first partial handle section; an ice scraping end diametrically opposed to said releasing end, said scraping end comprising a scraper section and a second partial handle section; and a handle positioned between said releasing end and said scraping end, said handle encompassing said first partial handle section and said second partial handle section.

In accordance with another aspect of the invention there is provided a kit for the construction of a dual function ice scraper and vehicle window releasing device, said kit comprising: a window seal releasing end, said releasing end comprising a blade section and a first partial handle section; one or more ice scraping ends, said one or more scraping ends comprising a scraper section and a second partial handle section; a connection mechanism to attach said first partial handle section to said second partial handle section; and a handle configured to be positioned between said releasing end and said scraping end, said handle sized and proportioned to encompass said first partial handle section and said second partial handle section.

In accordance with yet another aspect of the invention there is provided a method of releasing vehicle windows from window seals using the device as described above, said method comprising: inserting said blade section of said window seal releasing end into space between a vehicle window and window seals; moving said blade section up and down to dislodge ice build-up; and moving said blade section right and left to dislodge ice build-up.

The advantages and features of the present invention will become better understood with reference to the following more detailed description and claims taken in conjunction with the accompanying drawings in which like elements are identified with like symbols.

To easily identify the discussion of any particular element or act, the most significant digit or digits in a reference number refer to the figure number in which that element is first introduced.

BRIEF DESCRIPTION OF THE DRAWINGS

To easily identify the discussion of any particular element or act, the most significant digit or digits in a reference number refer to the figure number in which that element is first introduced.

FIGS. 5A and B illustrate an additional aspect of the subject matter in accordance with a further embodiment of the invention.

DETAILED DESCRIPTION

Devices and methods for carrying out the invention are presented in terms of embodiments depicted within the FIGS. However, the invention is not limited to the described embodiments, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and the configurations shall be shown and described for purposes of clarity and disclosure and not by way of limitation of scope.

The currently described embodiments of the invention relate to an ice and snow scraper device that is designed to have dual functionality. One of the scraper blades is sized, shaped and dimensioned to scrape ice and snow from a vehicle windscreen of from vehicle windows. The other end is sized, shaped and dimensioned to fit between the glass of vehicle windows and the weather stripping so as to be able to free up frozen vehicle windows. The device is small, it can fit in your hand comfortably and can be easily be stored in the vehicle.

One end of the Scrape 'N' Slide™ device has a sharp and flat edge designed to scrape away ice and snow build up on windows and screens on the vehicle. The opposing end of the Scrape 'N' Slide™ device is thin and has rounded edges and corners that will not damage the weather stripping when the device drops down inside the weather stripping next to the glass releasing the weather seal when and where frozen sections have formed.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

Figure 1:
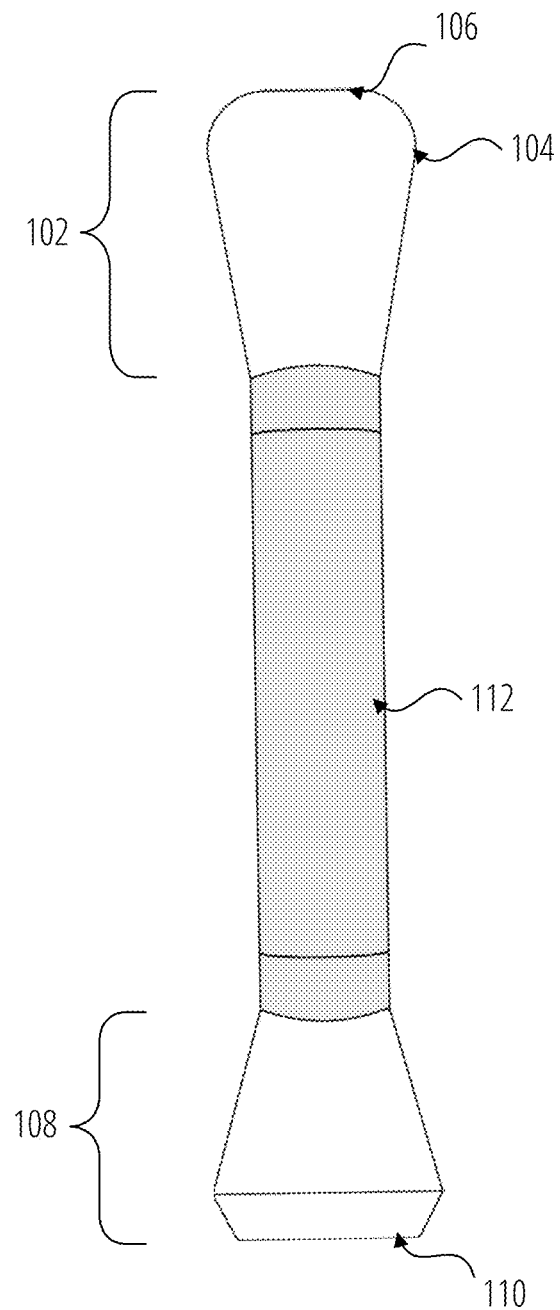
FIG. 1 illustrates a top view of the subject matter in accordance with one embodiment of the invention.

FIG. 1 illustrates a top view of an embodiment of the invention.

The device can be seen to have an elongated shape having a window seal releasing end 102 and an ice scraping end 108 positioned in an opposing relationship. The window seal releasing end 102, in the illustrated embodiment, has an essentially triangular shape with rounded edges 106 and rounded corners 104. The thickness of the material used to fabricate the window seal releasing end 102 is such that it can be slid into the gap between the vehicle window and the surrounding weather resistant seals. Similarly, the length of the window seal releasing end 102 is selected such that it extends down in between the vehicle window and the surrounding weather resistant seals to where frozen sections have formed.

The thickness material used to fabricate the window seal releasing end 102 is typically in the region of 1.0-3.0 mm, optimally approximately 1.5 mm. The materials used to fabricate the window seal releasing end 102 are of sufficient strength to dislodge frozen ice deposits that have formed within the window cavity in the vehicle door, but may have a degree of flexibility to be able to bend as and when desired. Suitable materials may include various plastics and polymers which have good resistance to weathering and are suitable for such outdoor applications.

The ice scraping end 108 as shown in the illustrated embodiment, also has an essentially triangular shape. However, the edge of the triangle that is at right angles to the elongated dimension of the device has a sharp edge 110. It is the sharp edge 110 that is intended to be used to scrape the snow and ice build-up from the vehicle screens and window. The thickness material used to fabricate the ice scraping end 108 is typically wider that the thickness if material used to fabricate the window seal releasing end 102. The increased thickness being required to withstand greater forces that may be applied to the device to dislodge the ice deposits. Typically thicknesses in the region of 5.0-10.0 mm, optimally approximately 6.0 mm.

The materials used to fabricate the ice scraping end 108 are of sufficient strength to dislodge frozen ice deposits that have formed on the vehicle screens and windows. Suitable materials may include various hard or dense plastics and polymers which have good resistance to weathering and are suitable for such outdoor applications.

A handle 112 section is fabricated in the section formed between the window seal releasing end 102 and the ice scraping end 108. The handle may be made from a weather resistant material, including but not limited to rubber and silicone.

Figure 2:
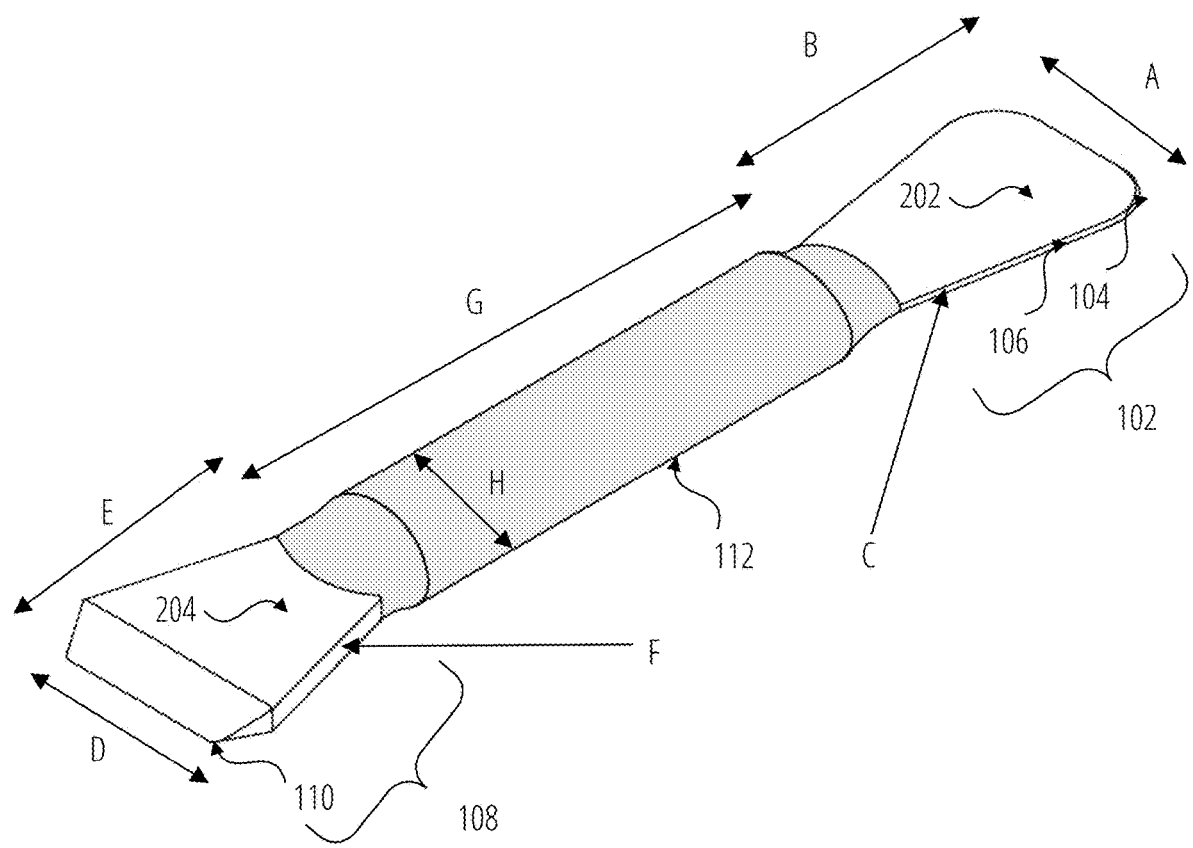
FIG. 2 illustrates a perspective view of the subject matter in accordance with one embodiment of the invention.

FIG. 2 illustrates a perspective view of an embodiment of the invention.

The window seal releasing end 102, having rounded corners 104 and rounded edges 106 can be seen positioned at one end of the device. The approximate dimensions of the blade section 202 of the window seal releasing end 102 shown in this embodiment of the invention are as follows: the width of the blade section 202 shown as dimension A is approximately 2.0" wide; the length of the blade section 202 shown as dimension B is approximately 2.5" wide; and the thickness of the blade section 202 shown as dimension C is approximately 1.5 mm".

The ice scraping end 108, having a sharp edge 110 can be seen positioned at the other end of the device. The approximate dimensions of the scraper section 204 of the ice scraping end 108 shown in this embodiment of the invention are as follows: the width of the scraper section 204 shown as dimension D is approximately 2.0" wide; the length of the scraper section 204 shown as dimension E is approximately 2.0" wide; and the thickness of the scraper section 204 shown as dimension F is approximately 6.0 mm".

The handle 112 section that is formed between the window seal releasing end 102 and the ice scraping end 108 shown as dimension D is approximately 1.0" wide.

Figure 3:
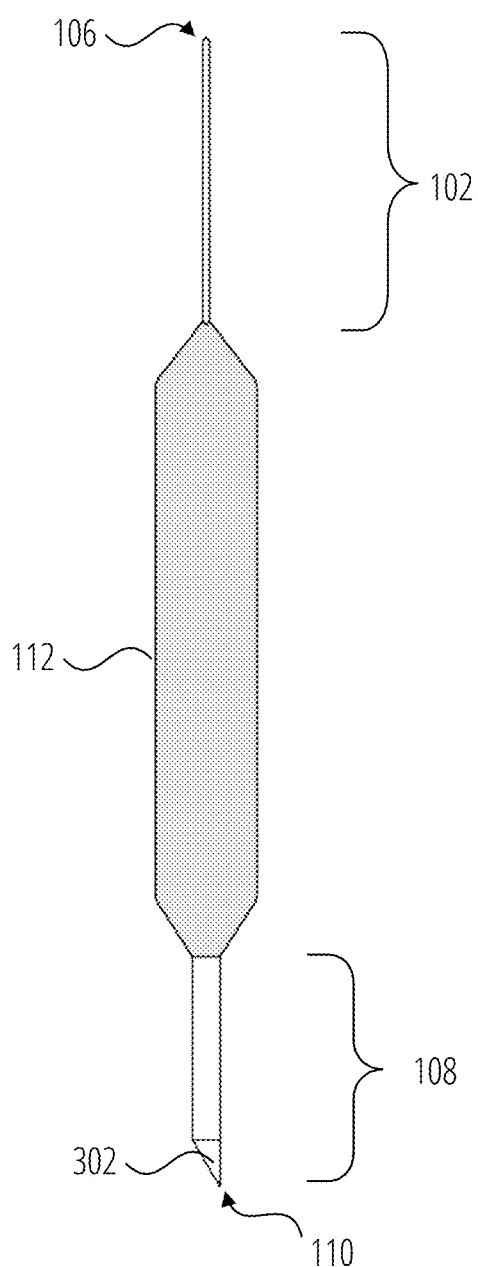
FIG. 3 illustrates a side view of the subject matter in accordance with one embodiment of the invention.

FIG. 3 illustrates a side view of an embodiment of the invention.

As shown in FIG. 1 and FIG. 2, the elongated device has a window seal releasing end 102 and an opposing ice scraping end 108 with a handle 112 interposed between. The window seal releasing end 102 has a rounded edge 106, whereas the ice scraping end 108 has a sharp edge 110.

Furthermore, the sharp edge 110 is shaped to form an angled scraper section 302 that assists with the removal of ice and snow build up. In the embodiment as illustrated, the angled scraper section 302 is angled at approximately 60° to a longitudinal axis of said device. Depending on the method of manufacture, the angled scraper section 302 can be formed by molding, printing or machining to the desired angle.

Figure 4A:
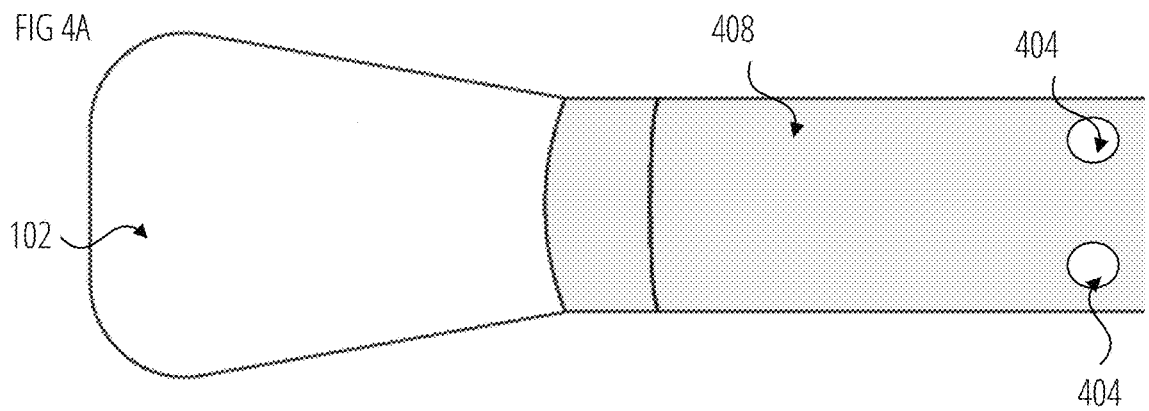
FIGS. 4A, B and C illustrate alternative aspect of the subject matter in accordance with various different embodiments of the invention.

FIGS. 4A, B, and C illustrate various different end options that may be selected to construct various different embodiments of the invention.

The embodiments of the invention shown in FIGS. 1-3 may have the window seal releasing end 102 and ice scraping end 108 fabricated as a unitary construction. In the alternative the window seal releasing end 102 and ice scraping end 108 may be individual constructions that are connected together by means known to those of skill in the field.

FIG. 4A shows a window seal releasing end 102 having a partial handle section 408 and connection mechanisms 404 to attach to a partial handle section 408 of an opposing ice scraping end 108.

Figure 4B:
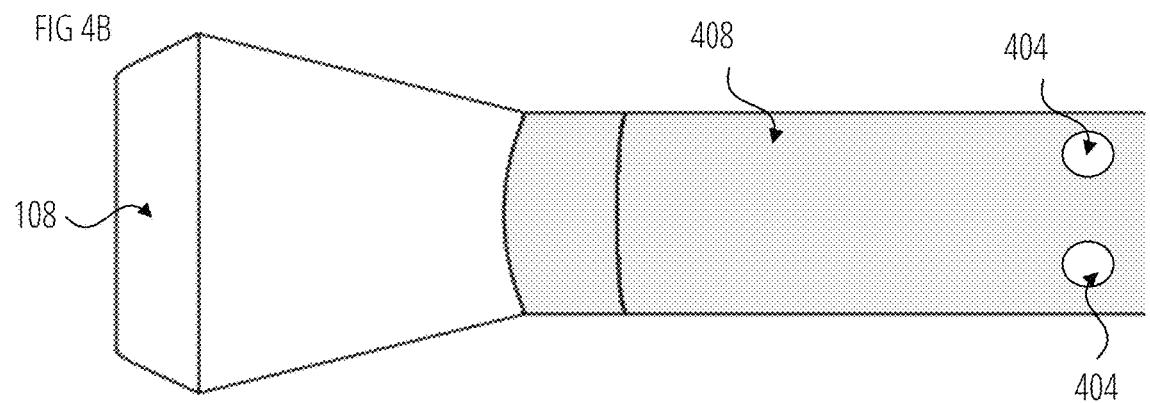

FIG. 4B shows an ice scraping end 108 having a partial handle section 408 and connection mechanisms 404 to attach to a partial handle section 408 of an opposing window seal releasing end 102.

Figure 4C:
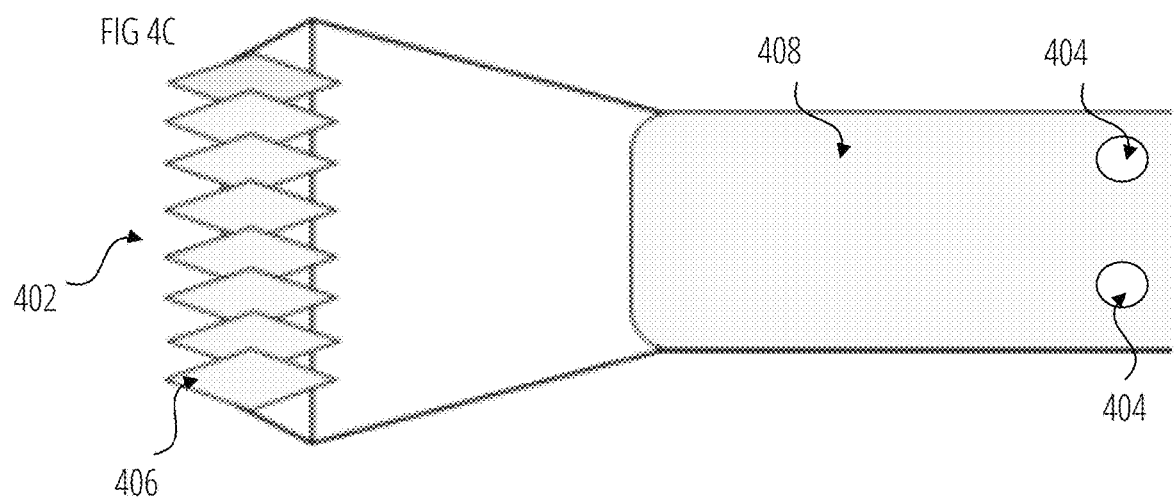

FIG. 4C shows an alternative ice scraping end 402 having a partial handle section 408 and connection mechanisms 404 to attach to an opposing partial handle section 408 of a window seal releasing end 102. The alternative ice scraping end 402 is fabricated to have one or more jagged members 406 to assist in ice removal.

FIGS. 5A and B illustrate fully constructed dual function ice scraper and vehicle window releasing devices in accordance with embodiments of the invention.

FIG. 5A shows a device in accordance with embodiments of the invention having separately fabricated window seal releasing end 102 and an ice scraping end 108. The ends being connected by way of a connection mechanism 404. A handle 112 being installed over the connection mechanism 404.

FIG. 5B shows a device in accordance with embodiments of the invention having separately fabricated window seal releasing end 102 and an alternative ice scraping end 402 having jagged members 406. The ends being connected by way of a connection mechanism 404. A handle 112 being installed over the connection mechanism 404.

As described above, the window seal releasing end 102 and ice scraping end 108 or alternative ice scraping end 402 can be fabricated as a unitary structure or they can be fabricated as separate parts. Indeed, in some embodiments of the invention, the window seal releasing end 102 and ice scraping end 108, or alternative ice scraping end 402, and handle 112 can be fabricated as a unitary structure.

When fabricated as separate parts, the ends can be joined or connected together using connection mechanisms 404 appropriate for the materials that the ends are fabricated from. The connection mechanisms 404 would be known to those of skill in the art and can include, but are not limited to: nuts; bolts; screws; washers; glues; polymer or plastic welding; bonding strips; tape; wrap; and heating/melting.

The scraper blade ends can be built from common components, although typically plastics are well suited for these products. The materials can be selected from the group including, but not limited to: Lexan™; plastics; Nylon™; acrylics; polycarbonates; polyoxymethylene; polystyrene (HIPS); PP; ABS; and PE. In some embodiments, the scraper blade ends and handle are a unitary structure and is fabricated from Lexan™; plastics; Nylon™; acrylics; polycarbonates; polyoxymethylene; polystyrene (HIPS); PP; ABS; and PE.

The plastics may be 3D printed, injection molded or extruded.

Examples of 3D printable plastics include, but are not limited to: polylactic acid, or PLA, this material has the benefit of being biodegradable as it is manufactured using renewable raw materials such as corn starch. ABS filament another type of 3D printing thermoplastic which contains a base of elastomers based on polybutadiene, making it more flexible, and resistant to shocks. ASA is a material that has similar properties to ABS, but has a greater resistance to UV rays. Polyethylene terephthalate, or PET, is ideal for fabricating larger more rigid frames. PETG, is a glycolyzed PET polymer that combines both the simplicity of PLA 3D printing and the strength of ABS, and it is 100% recyclable. Numerous other 3D printable polymers, hybrids and composites are known and considered to be within the scope of protection sought along with combinations thereof.

Plastics that are particularly suitable for injection molding include, but are not limited to: Lexan™; Nylon™; acrylics, which are particularly suitable for being tinted; polycarbonate (PC); polyoxymethylene (POM); polystyrene (PS); acrylonitrile butadiene styrene (ABS); polypropylene (PP); polyethylene (PE); thermoplastic polyurethane (TPU); and thermoplastic rubber (TPR) or combinations thereof.

Plastics that are particularly suitable for extrusion include but are not limited to: polyethylene (PE); polypropylene; acetal; acrylic; Nylon™; polyamides; polyvinyl chloride (PVC); acrylonitrile butadiene styrene (ABS); and polycarbonate or combinations thereof. The handle may be made from a weather resistant material, including but not limited to: natural rubber (Isoprene); styrene-butadiene rubber (SBR); butyl rubber (IIR); nitrile (also known as NBR rubber and Buna-N); Neoprene® (CR); Ethylene Propylene Diene Monomer (EPDM); silicone; Viton® (FKM); polyurethane (AU); and hydrogenated nitrile rubber (HNBR) or combinations thereof.

The embodiments of the invention as described herein allowing the vehicle driver to open or close the vehicle window, thereby facilitating access to drive thorough kiosks, or to allow smokers to open windows when appropriate. The device will prevent breaking the door glass or the window regulator by trying to force/roll the window down.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A dual function ice scraper and vehicle window releasing device, said device consisting of:
   a handle having a first end removably secured to a second end, wherein the first end of the handle is separable from the second end of the handle along a lateral axis disposed on a middle point of the handle;
   a window seal releasing end fixedly secured to the first end of the handle, wherein the window seal releasing end comprises a triangular shape having a pair of rounded distal corners;
   wherein the window seal releasing end has a maximum thickness between 1.0 mm and 2.0 mm;
   wherein the window seal releasing end is configured to fit between a vehicle window and a window seal of the vehicle window;
   wherein the window seal releasing end is composed of rubber;
   an ice scraping end fixedly secured to the second end of the handle, wherein the ice scraping end comprises a thickness greater than a thickness of the window seal releasing end, the thickness measured between opposing faces of the ice scraping end and the window seal releasing end, respectively;
   wherein the ice scraping end forms a tapered, sharp distal edge;
   wherein the window seal releasing end and the ice scraping end are non-adjustable relative to the handle;
   wherein the lateral axis of the handle, the window seal releasing end, and the ice scraping end are disposed on a same longitudinal plane of the device.

2. The device of claim 1, wherein said ice scraper end has an approximate triangular shape.

3. The device of claim 1, wherein said ice scraper end is between 5.0-10.0 mm wide.

4. The device of claim 1, wherein the window seal releasing end is 1.5 mm wide and said ice scraper section is 6.0 mm wide.

5. The device of claim 1, wherein said window seal releasing end and said ice scraping end are injection molded using:
   acrylics; polycarbonate (PC); polyoxymethylene (POM); polystyrene (PS);
   acrylonitrile butadiene styrene (ABS); polypropylene (PP); polyethylene (PE); thermoplastic polyurethane (TPU); and thermoplastic rubber (TPR), or combinations thereof.

6. The device of claim 1, wherein said window seal releasing end and said ice scraping end are extrusion molded using:
   polyethylene (PE); polypropylene; acetal; acrylic; polyamides; polyvinyl chloride (PVC); acrylonitrile butadiene styrene (ABS); and polycarbonate, or combinations thereof.

7. The device of claim 1, wherein said window seal releasing end and said ice scraping end are 3D printed using: polylactic acid (PLA); ABS filaments; polybutadiene elastomers; ASA; polyethylene terephthalate; PET; and PETG, or combinations thereof.

8. The device of claim 1, wherein said handle is composed of:
   natural rubber (Isoprene); styrene-butadiene rubber (SBR); butyl rubber (IIR); nitrile (also known as NBR rubber and Buna-N); (CR); Ethylene Propylene Diene Monomer (EPDM); silicone; polyurethane (AU); and hydrogenated nitrile rubber (HNBR) or combinations thereof.

9. The device of claim 1, wherein said window seal releasing end; said ice scraping end; and said handle are composed of:

acrylics; polycarbonate (PC); polyoxymethylene (POM); polystyrene (PS); acrylonitrile butadiene styrene (ABS); polypropylene (PP); polyethylene (PE); thermoplastic polyurethane (TPU); thermoplastic rubber (TPR), polyethylene (PE); polypropylene; acetal; polyamides; polyvinyl chloride (PVC); acrylonitrile butadiene styrene (ABS); polylactic acid (PLA); ABS filaments; polybutadiene elastomers; ASA; polyethylene terephthalate; PET; and PETG, or combinations thereof.

10. The device of claim 1, wherein the ice scraping end comprises a straight beveled edge perpendicular to the longitudinal axis.

* * * * *